US008454740B2

(12) United States Patent
Reinke et al.

(10) Patent No.: US 8,454,740 B2
(45) Date of Patent: *Jun. 4, 2013

(54) BITUMINOUS PAVING COMPOSITION AND PROCESS FOR BITUMINOUS PAVING

(75) Inventors: Gerald H. Reinke, La Crosse, WI (US); Gaylon Baumgardner, Jackson, MS (US)

(73) Assignee: Alm Holding Co., Onalaska, WI (US)

( * ) Notice: Subject to any disclaimer, the term of this patent is extended or adjusted under 35 U.S.C. 154(b) by 499 days.

This patent is subject to a terminal disclaimer.

(21) Appl. No.: 11/684,973

(22) Filed: Mar. 12, 2007

(65) Prior Publication Data

US 2007/0191514 A1    Aug. 16, 2007

Related U.S. Application Data

(63) Continuation-in-part of application No. 11/374,747, filed on Mar. 14, 2006, and a continuation-in-part of application No. PCT/US2006/033907, filed on Aug. 30, 2006.

(60) Provisional application No. 60/716,204, filed on Oct. 5, 2006.

(51) Int. Cl.
*C08L 95/00* (2006.01)

(52) U.S. Cl.
USPC ..... 106/273.1; 106/275; 106/277; 106/281.1; 106/283.1; 106/283; 106/284.03; 106/284.06; 524/68; 524/71

(58) Field of Classification Search
USPC ............... 106/273.1, 275, 277, 281.1, 283, 106/284.03, 284.06; 524/68, 71
See application file for complete search history.

(56) References Cited

U.S. PATENT DOCUMENTS

| 1,014,103 | A | 1/1912 | Wallbaum |
|---|---|---|---|
| 1,373,661 | A | 4/1921 | Johansen |
| 1,384,805 | A | 7/1921 | McSwiney |
| 1,542,626 | A | 6/1925 | MacKay |
| 1,640,544 | A | 8/1927 | Headley |
| 1,674,523 | A | 6/1928 | Sadtler |
| 1,778,760 | A | 10/1930 | Hay |
| 1,086,250 | A | 5/1931 | Barton et al. |
| 1,815,089 | A | 7/1931 | Alsdorf |
| 1,834,552 | A | 12/1931 | Sadtler et al. |
| 1,842,139 | A | 1/1932 | Alsdorf |
| 1,887,518 | A | 11/1932 | Sadtler |
| 1,888,295 | A | 11/1932 | Smith |
| 1,932,648 | A | 10/1933 | Taylor |
| 1,948,881 | A | 2/1934 | Kirschbraun |
| 1,988,336 | A | 1/1935 | Roediger |
| 1,988,879 | A | 1/1935 | Steininger |
| 2,023,068 | A | 12/1935 | Flood |
| 2,025,945 | A | 12/1935 | Forrest |
| 2,046,902 | A | 7/1936 | Kirschbraun |
| 2,087,401 | A | 7/1937 | Fair |
| 2,191,295 | A | 2/1940 | Dohse |
| 2,243,519 | A | 5/1941 | Barth |
| 2,283,192 | A | 5/1942 | Ditto |
| 2,317,959 | A | 4/1943 | Johnson et al. |
| 2,340,449 | A | 2/1944 | Barwell |
| 2,374,732 | A | 5/1945 | Colburn |
| 2,427,488 | A | 9/1947 | Anderson et al. |
| 2,461,971 | A | 2/1949 | Fischer |
| 2,550,481 | A | 4/1951 | Jense |
| 2,861,787 | A | 11/1958 | Csanyi |
| 2,901,369 | A | 8/1959 | Pordes |
| 2,917,395 | A | 12/1959 | Csanyi |
| 3,904,428 | A | 9/1975 | McConnaughay |
| 4,198,177 | A | 4/1980 | Brett et al. |
| 4,348,237 | A | 9/1982 | Ruckel |
| 4,592,507 | A | 6/1986 | Benedict |
| 4,692,350 | A | 9/1987 | Clarke et al. |
| 4,743,304 | A | * | 5/1988 | Gilmore et al. ............... 106/671 |
| 4,836,857 | A | 6/1989 | Hopkins |
| 5,109,041 | A | 4/1992 | Matsuno et al. |

(Continued)

FOREIGN PATENT DOCUMENTS

| AU | 433003 B2 | 8/1972 |
|---|---|---|
| AU | 433003 | 2/1973 |

(Continued)

OTHER PUBLICATIONS

Low Energy Asphalt (LEA) with the Performance of Hot-Mix Asphalt (HMA), European Roads Review, Special Issue, BGRA, Feb. 2004 (pp. 1-11).
International Search Report issued in PCT/US2006/33907, mailed Sep. 24, 2007, 4 pages.
Bonola et al., "Technologies for the Production of Asphalt Mixes With Low Temperature Processes," World Road Association Italian National Committee, Dec. 2005, 27 pp.
Barreto, "Warm Asphalt Mixes Containing Dispersed Water," ARKEMA-CECA France, Abstract No. 658, 2006, 7 pp.
Kristjansdorttir, "Warm Mix Asphalt for Cold Weather Paving, Warm Mix Asphalt for Cold Weather Paving," a thesis, University of Washington, 2006, 127 pp.

(Continued)

*Primary Examiner* — Peter Szekely
(74) *Attorney, Agent, or Firm* — Kagan Binder, PLLC

(57) ABSTRACT

The invention provides a bituminous composition, a process for preparing a bituminous paving composition and process for bituminous paving having lower mixing, paving, and compaction temperatures than for conventional hot-mix paving while retaining sufficient performance characteristics of conventional hot-mix paving. The inventive paving process comprises the steps of injecting a heated foamable solution comprising a lubricating substance into a heated, asphalt binder to provide a heated, foamed mixture; adding the heated, foamed mixture to a suitable, heated aggregate; further mixing the heated, foamed mixture and heated aggregate to coat the heated aggregate with the heated, foamed, asphalt binder to form a heated paving material; supplying the heated paving material to a paving machine; applying the heated paving material by the paving machine to a surface to be paved; and compacting the applied paving material to form a paved surface.

18 Claims, No Drawings

U.S. PATENT DOCUMENTS

| | | | |
|---|---|---|---|
| 5,539,029 A * | 7/1996 | Burris | 524/60 |
| 5,721,296 A * | 2/1998 | Mizunuma et al. | 524/60 |
| 5,772,749 A | 6/1998 | Schilling et al. | |
| 5,788,755 A | 8/1998 | Salminen | |
| 5,827,360 A | 10/1998 | Salminen | |
| 6,451,885 B1 | 9/2002 | Dresin et al. | |
| 6,559,206 B1 | 5/2003 | Durand et al. | |
| 6,576,050 B1 | 6/2003 | Samanos | |
| 6,793,964 B2 | 9/2004 | Hoad | |
| 6,846,354 B2 | 1/2005 | Larsen et al. | |
| 7,041,165 B2 | 5/2006 | Malot | |
| 7,114,843 B2 | 10/2006 | Romier et al. | |
| 7,114,875 B2 | 10/2006 | Romier et al. | |
| 7,160,943 B2 | 1/2007 | Burris et al. | |
| 7,297,204 B2 * | 11/2007 | Crews et al. | 106/277 |
| 7,309,390 B2 * | 12/2007 | Falkiewicz | 106/284.04 |
| 2002/0170464 A1 | 11/2002 | Larsen et al. | |
| 2004/0014845 A1 * | 1/2004 | Takamura et al. | 524/59 |
| 2004/0223808 A1 | 11/2004 | Romier et al. | |
| 2004/0244646 A1 | 12/2004 | Larsen et al. | |
| 2005/0018530 A1 | 1/2005 | Romier et al. | |
| 2006/0086288 A1 | 4/2006 | Bourrel et al. | |
| 2006/0169173 A1 | 8/2006 | Dupuis et al. | |
| 2006/0236614 A1 | 10/2006 | Antonie et al. | |
| 2006/0240185 A1 | 10/2006 | Antoine et al. | |
| 2007/0039520 A1 | 2/2007 | Crews et al. | |
| 2007/0060676 A1 | 3/2007 | Reinke | |
| 2007/0082983 A1 | 4/2007 | Crews et al. | |
| 2007/0191514 A1 | 8/2007 | Reinke et al. | |

FOREIGN PATENT DOCUMENTS

| | | |
|---|---|---|
| EP | 1398351 A1 | 3/2004 |
| EP | 1263885 B1 | 6/2004 |
| EP | 1 469 038 | 10/2004 |
| EP | 0994923 | 1/2006 |
| GB | 429548 | 5/1935 |
| GB | 2006220 | 5/1979 |
| WO | 87/02694 | 7/1981 |
| WO | 9522661 A1 | 8/1995 |
| WO | 01/48089 | 7/2001 |
| WO | 0162852 A1 | 8/2001 |
| WO | 2002103116 | 12/2002 |
| WO | 2005081775 | 9/2005 |
| WO | 2006106222 | 10/2006 |
| WO | 2007/032915 | 3/2007 |

OTHER PUBLICATIONS

Koenders et al., "Innovative process in asphalt production and application to obtain lower operating temperatures," 2nd Eurasphalt & Eurobitume Congress Barcelona 2000, Book II, pp. 830-840.

Jenkins et al., "Half-Warm Foamed Bitumen Treatment, A New Process," 7th Conference on Asphalt Pavements for Southern Africa, 1999, 17 pp.

International Search Report and Written Opinion issued in PCT/US2009/052830, mailed Sep. 16, 2010, 9 pages.

PRIPOL 1045 Safety Data Sheet; Aug. 7, 2008.

Extended European Search Report, EP Application No. 06790099.3, mailed Jan. 4, 2013.

Jenkins, "Mix Design Considerations for Cold and Half-Warm Bituminous Mixes with Emphasis on Foamed Bitumen," dissertation submitted to the Department of Civil Engineering, University of Stellenbosch in fulfillment for the degree of Doctor of Philosophy, Sep. 1, 2000, pp. I-XVII, 1.

Maccarrone et al., "Cold Asphalt Systems as an Alternative to Hot Mix," XP055014266, pp. 1-6, Jan. 1, 1995.

Maccarrone et al., "Pavement Recycling Using Foamed Bitumen," Proceedings 17$^{th}$ ARRB Conference, Part 3, pp. 349-365.

Booth et al., "Development of Very High Bitumen Content Emulsions for Sprayed Sealing," Proceedings 17$^{th}$ ARRB Conference, Part 3, pp. 73-89.

* cited by examiner

BITUMINOUS PAVING COMPOSITION AND PROCESS FOR BITUMINOUS PAVING

This application is a continuation-in-part of U.S. patent application Ser. No. 11/374,747 filed Mar. 14, 2006 and International Application No. PCT/US2006/033907, filed Aug. 30, 2006, both entitled "Bituminous Paving Composition and Process for Bituminous Paving", both claiming the benefit of U.S. Provisional Application No. 60/716,204, filed Sep. 12, 2005 and entitled "Process for Bituminous Paving", the entire disclosures of these documents are hereby incorporated by reference.

FIELD OF THE INVENTION

The field of the present invention relates generally to a bituminous paving composition and to a process of bituminous paving, and more particularly to a bituminous paving composition comprising a combination of a foamed, lubricating substance, an asphalt binder, and an aggregate.

BACKGROUND

Paving roadways, driveways, parking lots, and the like with a bituminous aggregate mixture material is well known. Typically, a mixture of a suitable aggregate comprising stones, gravel, sand, and the like, is heated at an elevated temperature of about 270-370° F. and mixed with a similarly hot, bituminous binder such as an asphalt-based binder (e.g., asphalt or asphalt plus polymer) until the aggregate particles are coated with the binder. Paving mixes made in this temperature range are often referred to as a hot mix. The mixing typically occurs away from the paving site, and the mixture is then hauled to the site and supplied to a paving machine. The mixture of asphalt and aggregate applied by the paving machine to a surface is then usually roller compacted by additional equipment while still at an elevated temperature. The compacted aggregate and asphalt material eventually hardens upon cooling. Because of the large mass of material in paving a roadway or commercial parking lot, the cost of the thermal energy to achieve suitable mixing and paving is considerable. For common binders, the thermoviscosity characteristics of the binder affect the temperature needed to provide thorough coating of the aggregate and consideration of the ambient conditions suitable for paving. Consequently, numerous processes have been devised to optimize aggregate coating and pavement binding while minimizing the cost of materials and/or the process.

As alternatives to hot-mix processes, there are cold-mix processes, where the aggregate, cold and moist, is mixed with a hot or cold binder, which can be an emulsion of asphalt dispersed in water using a suitable surfactant or a mixture of asphalt and a suitable hydrocarbon solvent, such as naphtha, #1 oil, or #2 oil, to name a few (generally referred to as a cutback asphalt). The emulsified asphalt particles coat and bind with the aggregate and remain after the water has evaporated. When a cutback asphalt is used, the hydrocarbon solvent evaporates at different rates depending on the volatility of the solvent. Regardless of the solvent volatility, what remains behind is a paving material where the asphalt component gradually hardens or stiffens over time as the solvent is removed. The binder can alternatively be foamed and mixed with the aggregate to enhance the coating efficacy. While less expensive than hot mixes, cold mixes usually are poorer quality than the hot mixes, and may have poorer binder coating, resulting in less cohesive compaction and durability. Additionally, cutback asphalt mixes have greater environmental impact due to the use of volatile hydrocarbon solvents. Some emulsions also utilize hydrocarbon solvents in addition to water to produce materials suitable for specific applications.

Recently, in an attempt to combine the advantages of hot-mix and cold-mix processes, warm-mix processes have been reported. In one example of a warm-mix process, both "soft" (a component with a lower viscosity than a "hard" component at a given temperature) and "hard" (a component with a higher viscosity than a "soft," component at a given temperature) components of a bituminous binder are used. The soft component is melted and mixed with aggregate at about 110-265° F., depending on the particular soft component. The heated hard component is then mixed with warm water so as to produce a foam which is mixed with the heated soft component/aggregate mix to achieve a final, coated, paving material. Although a warm-mix paving material can be paved at lower temperatures than hot-mix materials, it requires a more extensive and complex process to produce the warm mix compared to a hot mix.

However the aggregate is coated, if the binder does not adhere well to the aggregate, the binder can separate, or "strip" from the aggregate, causing the material not to remain well-compacted and thereby reducing the overall strength of the pavement. To aid adherence of the binder to the aggregate, the aggregate or more generally the asphalt binder may be treated with an antistripping compound or material (e.g., surfactants) to substantially reduce binder stripping by acting as a binding agent between the aggregate granules and bituminous binder.

Regardless of the aggregate/binder mixing process used, it is essential that the coated paving material not harden together during transport or while in the paving machine or not lack the ability to be compacted to the proper density. Inadequately coated aggregate material, though easy to mix and handle, can cause the paved material not to remain compacted, not to properly support traffic, or not to wear and weather well.

SUMMARY OF THE INVENTION

The present invention provides a process for bituminous paving suitable for primary construction having significantly lower mixing, paving, and compaction temperatures (temperatures that are 30-80° F. lower) than for conventional hot-mix paving while retaining sufficient hardening, density, and durability characteristics of conventional hot-mix paving. Generally, the inventive process comprises injecting a foamable lubricating solution into a heated, asphalt binder so as to create a foam-containing, asphalt-based mixture; adding the mixture to a heated aggregate; further mixing the foam-containing, asphalt binder mixture and aggregate using, for example, a drum mixer, so as to coat the aggregate to form a paving material; applying the paving material to a prepared surface; and then compacting the applied paving material to form a paved surface.

The present invention also provides a bituminous paving composition comprising about 0.01-3 wt. %, relative to the weight of the asphalt binder, of a lubricating substance; about 3-9 wt. % asphalt binder; and about 91-97 wt. % aggregate. The lubricating substance is typically about 5-10 wt. % cationic, anionic or non-ionic surfactant, such as soap solids, and about 90-95 wt. % water. Alternative lubricating substances may have a soap solids concentration as low as 1 wt. % and, generally, 30-40% is practical upper limit for pumpability of the soap solution.

The composition may further comprising an antistripping material such as a primary amine, a secondary amine, a tertiary amine, an imido amine, an imidazoline, or a phosphate ester wherein the number of carbon atoms in the antistripping material is in the range of about 7 to 20. Alternatively, other antistripping materials that are known in the art are also suitable. When used in the composition, the amount of antistripping material is in the range of about 0.1%-10% by weight of the lubricating substance.

DETAILED DESCRIPTION

In one embodiment, the inventive process comprises injecting a foamable solution comprising a lubricating substance into a heated, asphalt binder so as to create a heated, foamed mixture; adding the heated, foamed mixture to a suitable aggregate heated to a temperature higher than the temperature of the heated, foamed mixture; further mixing the two so as to coat the heated aggregate with the heated, foamed mixture to form a heated paving material; transferring the heated paving material to a paving machine; applying the heated paving material with the paving machine at a paving temperature to a prepared surface; and then compacting the applied paving material to form a paved surface.

One feature of the use of a foamable lubricating solution, such as an aqueous foam, is that its imparted lubricity allows the temperature of the paving material during paving to be significantly lower (e.g., about 30-80° F. lower) than the temperature required to soften the binder to provide similar constructability. Another feature is that an aqueous foam comprising a lubricating substance or material requires much less water to similarly disperse the lubricating material than a normal emulsion or water solution would. Thus, less volume of water has to be delivered, handled, and eventually evaporated from the paved mixture. A suitable lubricating material is a soap. Non-limiting examples of suitable soaps include sodium soaps of fatty acids, sodium soaps of sulfonic acids, ethoxylated nonylphenols, quaternary amine chlorides, and sodium or potassium soaps of crude or refined tall oils. Other cationic, anionic or non-ionic surfactants may also be used as suitable lubricating materials. Additional lubricating materials include acid reacted salts of fatty amines including but not limited to hydrochloride or acetic acid salts of fatty amines where the amines may be derived from primary, secondary, tertiary or polyamines. Further lubricating materials may include amine salts derived from imidazolines.

The substantially lower paving temperature provided by the invention may (1) reduce the cost of thermal energy used, without adversely affecting the paving process or the resultant pavement; (2) reduce emission of volatile components, thereby reducing air pollution; or (2) allow use of a "stiffer" grade of asphalt in the paving material. For example, a more readily available PG 64-22 binder mixed with a lubricating foam may be used instead of a less stiff, PG 58-28 binder at the same warm-mix processing temperatures resulting in a pavement having performance similar to the hot mix pavement produced with the PG 58-28 binder.

Asphalt-based binders include petroleum-based binders. Asphalt binders may include additives, for example, such as polymeric materials. Suitable asphalt-based or asphalt binders include those binders complying with ASTM D-6373, D-3387, or D-946. However, some asphalt binders in substantial but not full compliance with ASTM D-6373, D-3387, or D-946 may be used. The aggregate may comprise reclaimed asphalt pavement (RAP).

In one embodiment of the present inventive process, the foamable solution is an aqueous solution that comprises a lubricating substance made from a soap. The paving material comprises about 91-97 wt. % aggregate and about 3-9 wt. % asphalt-based binder. The amount of lubricating substance soap solids used for a given amount of aggregate is about 0.01-3 wt. % relative to the weight of the asphalt-based binder used.

In another embodiment of the present process, the foamable solution is mixed with a latex rubber solution, such as but not limited to a SBR latex rubber solution. The combined mixture of the foamable and latex rubber solutions is then injected into the asphalt binder and further combined with aggregate to provide a warm-mix paving composition. Suitable amounts of latex rubber for use in the present process and paving compositions are in the range of 0.5-5% by weight of rubber solids in the latex solution based on the amount of asphalt binder used in the present process.

The heated, foamed-asphalt-binder mixture is heated to a temperature that is less than the temperature used to form a conventional hot mix. Depending on the particular asphalt binder that is used, suitable temperatures are in the range of about 180-340° F. Similarly, the suitable aggregate is heated to a temperature in the range of about 180-300° F. and the heated paving material is heated and mixed at a temperature in the range of about 180-300° F. The paving material is paved at a temperature in the range of about 170-290° F., and compacted at a temperature in the range of about 150-270° F. The foamable soap solution can be at any temperature that does not freeze, boil the liquid, or adversely affect the foaming, but it is preferable that its temperature be in the range of about 80-150° F.

This embodiment may be performed by injecting of the foamable solution into a heated, asphalt binder; adding the heated, foamed mixture to a suitable aggregate and mixing to form the heated paving material in situ at or near the work site. One advantage of the invention is that its significantly less volume of liquid used to mix the asphalt binder with the aggregate allows the convenience of in situ processing and reduces the need to transport large volumes of water.

In another embodiment of this invention, the foamable solution is heated before being mixed with the asphalt binder. The foamable solution may be maintained at an elevated temperature of about 30-200° F. before it is injected into the heated asphalt binder that is maintained at a temperature of about 180-380° F. In still other embodiments, the foamable solution is maintained at a temperature of about 50-200° F. In further embodiments the foamable solution is maintained at a temperature of 100-200° F.

After the foamable solution is injected into the heated asphalt binder, the mixture may be added or pumped into a static mixer or to an expansion chamber. This allows the foamable solution to generate a foam and expand in volume in a region of reduced back pressure. In some embodiments, compressed air may be sparged into the static mixer or expansion chamber to assist in the development of a foamed mixture of the foamable solution and the asphalt binder. If desired, a suitable expansion chamber may include a mechanical agitating or mixing apparatus to agitate the foamable solution and asphalt binder. Alternatively, if the foamable solution is added to the asphalt binder shortly before being mixed with aggregate, there is generally no need to provide for a separate region where the back pressure is reduced.

In another embodiment of the inventive process, the aqueous solution comprises about 30 wt. % soap solids and about 70 wt. % water; the asphalt binder comprises # PG 58-28 asphalt; the paving material comprises about 94.5 wt. % aggregate and about 5.5 wt. % # PG 58-28 asphalt binder; and the amount of soap solids used is less than about than 1 wt. % relative to the weight of the asphalt binder used. For this particular binder, the heated, foamed-asphalt-binder mixture is heated to a temperature of about 240-340° F.; the suitable aggregate is heated to a temperature in the range of about 180-300° F.; and the heated paving material is heated and mixed at a temperature in the range of about 180-300° F. The paving material is paved at a temperature in the range of about 170-290° F., and compacted at a temperature in the range of about 150-270° F.

In another embodiment, the aqueous solution comprises about 30 wt. % soap solids and about 70 wt. % water; the asphalt binder comprises # PG 64-22 asphalt; the paving material comprises about 94.5 wt. % aggregate and about 5.5 wt. % # PG 64-22 asphalt binder; and the amount of soap solids used is less than about 1 wt. % relative to the weight of the asphalt binder used. For this particular asphalt binder, the heated, foamed-asphalt-binder mixture is heated to a temperature about 240-340° F.; the suitable aggregate is heated to a temperature in the range of about 180-300° F.; and the heated paving material is heated and mixed at a temperature in the range of about 180-300° F. The paving material is paved at a temperature in the range of about 170-290° F., and compacted at a temperature in the range of about 150-270° F. Those of ordinary skill in the art will appreciate that the heated, foamed-asphalt-binder mixture and suitable aggregate may be heated and mixed at higher temperatures and the paving material may also be paved and compacted at a higher temperatures without adversely affecting the performance of the paved material, but doing so would be more costly in heating energy expense.

Typically, the asphalt temperature needs to be higher than the aggregate temperature. Depending on the asphalt grade, the asphalt might need to be as hot as 325° F. or hotter so that it can be pumped and will foam. The aggregate temperature essentially controls the mix temperature since it constitutes approximately 90% of the mix by weight. The aggregate temperature needs to be controlled to the warm-mix range of about 180°-300° F. When mixing aggregate with stiff binders or those containing a polymer, the normal aggregate and mixing temperature could be as hot as 350° F., which is a hot mix, but using the present invention with the same aggregate and binder, the aggregate and mixing temperature could be reduced to 300° F., which is considered a warm mix, without adversely affecting the resulting pavement's performance.

In another embodiment of the inventive process, the foamable solution further comprises an antistripping material. Non-limiting examples of a suitable antistripping material are a primary amine, a secondary amine, a tertiary amine, an imido amine, an imidazoline, or a phosphate ester wherein the number of carbon atoms in these materials is in the range of about 7 to 20.

In yet another embodiment of the inventive process, the aqueous solution further comprises an antistripping material such that the foamable solution comprises about 30 wt. % soap solids, about 5 wt. % antistripping material, and about 65 wt. % water.

EXAMPLES

The following examples provide processing and test data for a number of asphalt binders and aggregates, with and without lubricating substances or agents, that are processed under conventional hot mix conditions and under the process of the present invention.

In these examples, E-1 mix is a specific mix type conforming to State of Wisconsin Department of Transportation ("WIDOT") requirements for pavements designed to carry up to 1 million Equivalent Single Axle Loads (ESALs) over a 20-year design life. The same is true for E-10, except the ESAL value is up to 10 million. The term ESAL is well-known to those working in the bituminous paving industry.

Tall oil soap and refined tall oil soap may be made by reacting the tall oil or refined tall oil typically with sodium or potassium hydroxide by any one of well-known methods to produce soap. Tall oil and refined tall oil are available from Arizona Chemical, Jacksonville, Fla.; Georgia Pacific, Atlanta, Ga.; and MeadWestvaco, Stamford, Conn. Molex antistripping material is a mixture of polycycloaliphatic amines available from Air Products, Allentown, Pa. Alpha Olefin sulfonate is available from Stepan Chemical, Winder, Ga. The choice of asphalt grade is dependent on site-specific variables such as the particular geographical location, local climate, traffic loads, etc.

One test of a paved material's performance is to simulate vehicle traffic stress by the number of repetitive passes a roller supporting a specified weight load must make to cause formation of a rut of a specified depth in the material. Such testing of compacted material produced by the inventive process was done using a testing machine referred to as a Hamburg Wheel Tracking ("HWT") Tester, also known as a PMW Wheel Tracker, available from Precision Machine and Welding, Salina, Kans. The number of Hamburg passes required to reach a rut depth of 10 mm when the compacted material tested in a dry condition was used for comparative evaluation. The test conditions were 158 lb. wheel load, 52 passes per minute at the test temperature using heated air to achieve the specimen test temperature. Generally, when all other variables are essentially the same, the greater the number of passes, the better the anticipated paving mix performance. Those persons of ordinary skill in the art and familiar with the HWT will recognize paving materials that are suitable for a particular application based on the results that are provided when samples are subjected to these test conditions.

In Table 1, examples where the mixing temperature is in the range of 270-280° F., and the compaction temperature is about 275° F. or higher are considered conventional hot-mixes for the particular binders that were processed and tested; examples where the mixing temperature is in the range of 230-235° F., and the compaction temperature is in the range of 215-220° F. are considered warm-mixes. Thus, examples 1, 4, 6, 7, and 10 are hot-mixes, and the other examples are warm mixes for these binders.

TABLE 1

| Example # and Mix Formulation | Asphalt Binder | Aggregate Mix Temperature and Conditions | Surfactant Solution Blend And/or Anti-strip Material | Wt % Surfactant, Soap Solids, or Anti-strip by Wt. of Binder | Compaction Temperature | Hamburg Passes to Rut Depth of 10 mm, Dry |
|---|---|---|---|---|---|---|
| #1: E-1 control mix at 280° F., lab mixed | PG 58-28 | 280° F. aged for 2 hrs at 275° F. | None | None | 275° F. | 2,361 passes at 50° C. |
| #2: E-1, same blend as #1, lab mixed | PG 58-28 | 230° F., aged for 30 minutes at 230° F. | Tall oil soap + Molex anti-strip | 1% | 215°–220° F. | 1,031 Passes at 50° C. |

TABLE 1-continued

| Example # and Mix Formulation | Asphalt Binder | Aggregate Mix Temperature and Conditions | Surfactant Solution Blend And/or Anti-strip Material | Wt % Surfactant, Soap Solids, or Anti-strip by Wt. of Binder | Compaction Temperature | Hamburg Passes to Rut Depth of 10 mm, Dry |
|---|---|---|---|---|---|---|
| #3: E-1, same blend as #1 | PG 58-28 | 230° F., aged for 30 minutes at 230° F. | Tall oil soap | 1% | 215°–220° F. | 791 passes at 50° C. |
| #4: E-10 mix | PG 58-28 | 280° F. aged for 2 hrs at 275° F. | Anti-strip added to binder, mixing performed at conventional temperature | None | 275° F. | 1,975 passes at 58.3° C. |
| #5: E-10 mix, same as #4 | PG 58-28 | 230° F., aged for 30 minutes at 230° F. | Refined tall oil soap + antistrip added to soap | 1% | 215°–220° F. | 1,625 passes at 57.8° C. |
| #6: E-1 mix, control test | PG 58-28 | Lab mixed at 280° F., cured for 2 hrs. at 275° F. | No additive | None | 275° F. | 3,351 passes at 58.5° C. |
| #7: E-1 mix, same as #6 | PG 58-28 | Mixed at 280° F., cured for 4 hrs. at 275° F. | No additive | None | 275° F. | 5,376 passes at 58.4° C. |
| #8: E-1 mix, same as #6 warm test mix | PG 58-28 | PG 58-28 + soap mixed at 230° F., cured for 30 minutes at 230° F. | Refined tall oil soap | 1% | 215°–220° F. | 981 passes at 58° C. |
| #9: E-1 mix, same as #6 warm test mix | PG 64-22 | PG 64-22 + soap mixed at 230° F., cured for 30 minutes at 230° F. | Refined tall oil soap | 1% | 215°–220° F. | 1,875 passes at 58.3° C. |
| #10: E-1 mix, same as #6 | PG 58-28 | Mixed at 280° F., cured for 2 hrs. at 275° F. | None | None | 275° F. | 1,601 passes at 58.6° C. |
| #11: E-1 mix, same as #6 warm test mix | PG 64-22 | PG 64-22 + surfactant + anti-strip, lab mixed at 230° F., cured for 30 minutes at 230° F. | Alpha Olefin sulfonate + phosphate ester anti-strip | 1% surfactant solids | 215°–220° F. | 1,226 passes at 58.3° C. |
| #12: E-1 mix, same as #6 warm test mix | PG 64-22 | PG 64-22 + soap + anti-strip, lab mixed at 230° F., cured for 30 minutes at 230° F., | Tall oil soap + amine anti-strip | 1% soap solids | 215°–220° F. | 3,351 passes at 58.4° C. |
| #13: Field mix trial, E-1 mix | PG 64-22 | PG 64-22 AC + soap, plant mixed at 230°–235° F. | Refined tall oil soap solution was at ~50° F. at the time of production | 0.9–1% soap solids | 210°–220° F. | 1,626 passes at 58.3° C. on field mix compacted in laboratory |
| #14: E-10 mix + 15% RAP + soap | PG 64-22 | E-10 mix + 15% RAP + soap, lab mixed at 230° F., cured for 30 minutes at 230° F. | Refined tall oil soap | 0.046% soap solids | 215°–220° F. | 6,601 passes at 58.5° C. |
| #15: E-10 mix + 15% RAP + soap | PG 64-22 | E-10 mix + 15% RAP + soap, lab mixed at 230° F., cured for 30 minutes at 230° F. | Refined tall oil soap | 0.069% soap solids | 215°–220° F. | 5,101 passes at 58.5° C. |
| #16: E-1 mix + soap | PG 64-22 | E-1 mix + soap, lab mixed at 230° F., cured for 30 minutes at 230° F. | Refined tall oil soap | 0.75% soap solids | 215°–220° F. | 1,451 passes at 58.2° C. |
| #17: E-1 mix + soap | PG 64-22 | E-1 mix + soap, lab mixed at 230° F., cured for 30 minutes at 230° F. | Refined tall oil soap | 0.075% soap solids | 215°–220° F. | 2,225 passes at 58.2° C. |

TABLE 1-continued

| Example # and Mix Formulation | Asphalt Binder | Aggregate Mix Temperature and Conditions | Surfactant Solution Blend And/or Anti-strip Material | Wt % Surfactant, Soap Solids, or Anti-strip by Wt. of Binder | Compaction Temperature | Hamburg Passes to Rut Depth of 10 mm, Dry |
|---|---|---|---|---|---|---|
| #18: E-1 mix + soap | PG 64-22 | E-1 mix + soap, lab mixed at 230° F., cured for 30 min at 230° F. | Refined tall oil soap | 0.15% soap solids | 215°–220° F. | 1,826 passes at 58.0° C. |
| #19: Field mix trial, E-1 mix containing 10% RAP, PG 64-22 AC + soap | PG 64-22 | E-1 mix containing 10% RAP, PG 64-22 AC + soap, plant mixed at 230°–240° F. | Refined tall oil soap, temperature of soap solution in the field was ~35° F. | 0.97% soap solids | laydown and compaction at 210°–225° F. | 1,976 passes at 58.3° C. |

As the data indicate, generally, using the same binder for the warm-mix as for the hot-mix does not produce the same results but does provide an acceptable paving material. The warm-mix has a lower number of Hamburg passes. This lower number is likely due to the fact that the binder does not age or cure as much during the warm mixing process due to the lower mix temperature and shorter curing time, as shown by comparing examples 1, 2, and 3. Examples 1, 6, and 7 show that curing greatly increases the performance of a hot-mix, and examples 16, 17, and 18 also show increased performance with curing even with decreased soap level. Examples 1 and 4 show that addition of only an antistrip to a hot-mix does not improve the pavement. Example 4 was tested at a slightly higher temperature and indicates an antistrip material increases performance. All other things being equal, as much as a 50% decrease in the number of passes to 10 mm rut depth may occur by increasing the test temperature 8° C. Examples 8 and 9 show that use of the invention with PG64-22, a stiffer binder than PG58-28, results in improved performance. Examples 14 and 15 show that use of the invention with PG64-22, 15% RAP, and a 30-minute cure gives the highest performance pavement. This data indicate that a binder of greater initial stiffness may be used to produce the warm mix to yield performance approximately equal to that of the less stiff binder used to make hot mix. A PG 58-28 binder is less stiff than a PG 64-22 binder, but as the data show, using a PG 64-22 binder in the warm mix produces Hamburg results approximately the same as the PG 58-28 results with the hot mix. Therefore, being able to substitute PG64-22 for PG58-28 by using the invention results in suitable pavement. Test results of binder recovered from both hot and warm-mixes, not disclosed, demonstrate the similarity of their properties.

This invention is not to be taken as limited to only the details of the embodiments described herein, as modifications and variations thereof may be made without departing from the spirit or scope of the invention as claimed.

What is claimed is:

1. A process of preparing a bituminous paving composition comprising the steps of:
   a) heating an aqueous solution comprising a lubricating substance to a temperature of 30-200° F.;
   b) combining the heated aqueous solution with an asphalt binder heated to a temperature of 230-340° F.;
   c) mixing the lubricating substance and asphalt binder in a static mixer or expansion chamber to provide a heated foamed asphalt binder and lubricating substance; and
   d) mixing the heated foamed asphalt binder and lubricating substance with a heated aggregate to coat the aggregate with the asphalt binder and lubricating substance and form a warm mix paving composition, wherein the warm mix paving composition temperature during paving is 30-80° F. lower than conventional hot mix temperatures.

2. The process of claim 1, wherein the lubricating substance is a soap; the paving composition comprises about 91-97 wt. % aggregate and about 3-9 wt. % asphalt binder; and the amount of soap used for a given amount of aggregate is about 0.01-3 wt. % relative to the weight of the asphalt binder.

3. The process of claim 1, wherein the aqueous solution comprises about 5-10 wt. % soap solids and about 90-95 wt. % water.

4. The process of claim 1, wherein the lubricating substance is a cationic, anionic, or non-ionic surfactant; the paving composition comprises about 91-97 wt. % aggregate and about 3-9 wt. % asphalt binder; and the amount of surfactant is about 0.01-3 wt. % relative to the weight of the asphalt binder.

5. The process of claim 1 further comprising the step of adding an antistripping material to the warm mix paving composition.

6. The process of claim 1 further comprising adding a latex rubber solution to the aqueous solution.

7. The process of claim 1, wherein the aqueous solution is heated to a temperature of about 100-200° F.

8. The process of claim 1 wherein compressed air is sparged into the static mixer or expansion chamber.

9. The process of claim 1 wherein the expansion chamber includes mechanical agitating or mixing apparatus to agitate the lubricating substance and asphalt binder.

10. The process of claim 1, wherein the warm mix paving composition is at a temperature of about 180-300° F. during paving.

11. The process of claim 10, wherein the warm mix paving composition is at a temperature less than about 230° F. during paving.

12. The process of claim 1, wherein the aqueous solution further comprises an antistripping material.

13. The process of claim 1, wherein the aggregate comprises reclaimed asphalt pavement material.

14. The process of claim 1, wherein the lubricating substance is soap solids and the soap solids are sodium soaps of fatty acids, sodium soaps of sulfonic acids, ethoxylated nonylphenols, quaternary amine chlorides, sodium or potassium soaps of crude or refined tall oils, acid reacted salts of fatty amines or amine salts derived from imidazolines.

15. The process of claim 5, wherein the antistripping material is a primary amine, a secondary amine, a tertiary amine, an imido amine, an imidazoline, or a phosphate ester wherein the number of carbon atoms in the antistripping material is in the range of about 7 to 20.

16. The process of claim 6, wherein the asphalt binder further comprises about 0.5 wt. %-5 wt. % latex rubber solids based on the weight of the asphalt binder.

17. The process according to claim 1, further comprising the step of compacting the warm mix paving composition to form a paved surface.

18. The process according to claim 1, wherein the step of combining the heated aqueous solution with the asphalt binder comprises injecting the heated aqueous solution into the asphalt binder.

* * * * *